United States Patent
Wessel

(10) Patent No.: US 10,297,282 B1
(45) Date of Patent: *May 21, 2019

(54) CONTACT DETECTION AND LASER POWER MONITORING SENSOR FOR HEAT-ASSISTED MAGNETIC RECORDING HEAD

(71) Applicant: Seagate Technology LLC, Cupertino, CA (US)

(72) Inventor: James Gary Wessel, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,142

(22) Filed: Jul. 25, 2018

Related U.S. Application Data

(63) Continuation of application No. 15/626,468, filed on Jun. 19, 2017, now Pat. No. 10,056,101.

(60) Provisional application No. 62/385,016, filed on Sep. 8, 2016.

(51) Int. Cl.

| G11B 11/00 | (2006.01) |
|---|---|
| G11B 5/60 | (2006.01) |
| G11B 5/31 | (2006.01) |
| G11B 5/48 | (2006.01) |
| G11B 5/00 | (2006.01) |
| G11B 7/126 | (2012.01) |

(52) U.S. Cl.
CPC ............ *G11B 5/6076* (2013.01); *G11B 5/315* (2013.01); *G11B 5/4866* (2013.01); *G11B 5/6088* (2013.01); *G11B 7/126* (2013.01); *G11B 2005/0021* (2013.01)

(58) Field of Classification Search
None
See application file for complete search history.

(56) References Cited

U.S. PATENT DOCUMENTS

| 7,589,928 | B2 | 9/2009 | Roy et al. | |
|---|---|---|---|---|
| 8,451,696 | B2 | 5/2013 | Huang et al. | |
| 8,477,455 | B2 | 7/2013 | Furukawa et al. | |
| 8,837,071 | B2 | 9/2014 | Macken et al. | |
| 9,030,773 | B2 | 5/2015 | Macken et al. | |
| 9,087,546 | B1 | 7/2015 | Grobis et al. | |
| 9,812,159 | B1 * | 11/2017 | Macken | G11B 5/4853 |
| 10,002,631 | B1 * | 6/2018 | Kiely | G11B 5/607 |
| 10,056,101 | B1 * | 8/2018 | Wessel | G11B 5/6076 |

(Continued)

*Primary Examiner* — Tan X Dinh
(74) *Attorney, Agent, or Firm* — Hollingsworth Davis, LLC

(57) ABSTRACT

A slider configured for heat-assisted magnetic recording comprises a magnetic writer, a near-field transducer, and an optical waveguide coupling the near-field transducer to a light source. The writer is situated proximate the near-field transducer at an air bearing surface of the slider and comprises a first return pole, a second return pole, and a write pole situated between and spaced apart from the first return pole and the second return pole. A structural element is situated at or near the air bearing surface between the write pole and one of the first and second return poles. The structural element comprises a cavity. A thermal sensor is disposed in the cavity. The thermal sensor is configured for sensing contact between the slider and a magnetic recording medium, asperities of the medium, and output optical power of the light source.

20 Claims, 11 Drawing Sheets

(56) References Cited

U.S. PATENT DOCUMENTS

| | | |
|---|---|---|
| 2008/0225426 A1 | 9/2008 | Roy et al. |
| 2012/0201108 A1* | 8/2012 | Zheng .................... G11B 5/607 |
| | | 369/13.26 |
| 2013/0279045 A1* | 10/2013 | Agari ....................... G11B 5/40 |
| | | 360/125.3 |
| 2013/0286802 A1* | 10/2013 | Kiely .................... G11B 13/04 |
| | | 369/13.31 |
| 2014/0269819 A1* | 9/2014 | Kiely ................... G11B 5/3116 |
| | | 374/45 |
| 2014/0334275 A1 | 11/2014 | Zheng et al. |
| 2015/0003223 A1 | 1/2015 | Macken et al. |
| 2015/0036469 A1* | 2/2015 | Johnson ................. G11B 13/08 |
| | | 369/13.33 |
| 2015/0085632 A1* | 3/2015 | Kiely ...................... G11B 5/41 |
| | | 369/53.38 |
| 2015/0109892 A1 | 4/2015 | Contreras et al. |
| 2015/0371669 A1 | 12/2015 | Lee et al. |

* cited by examiner

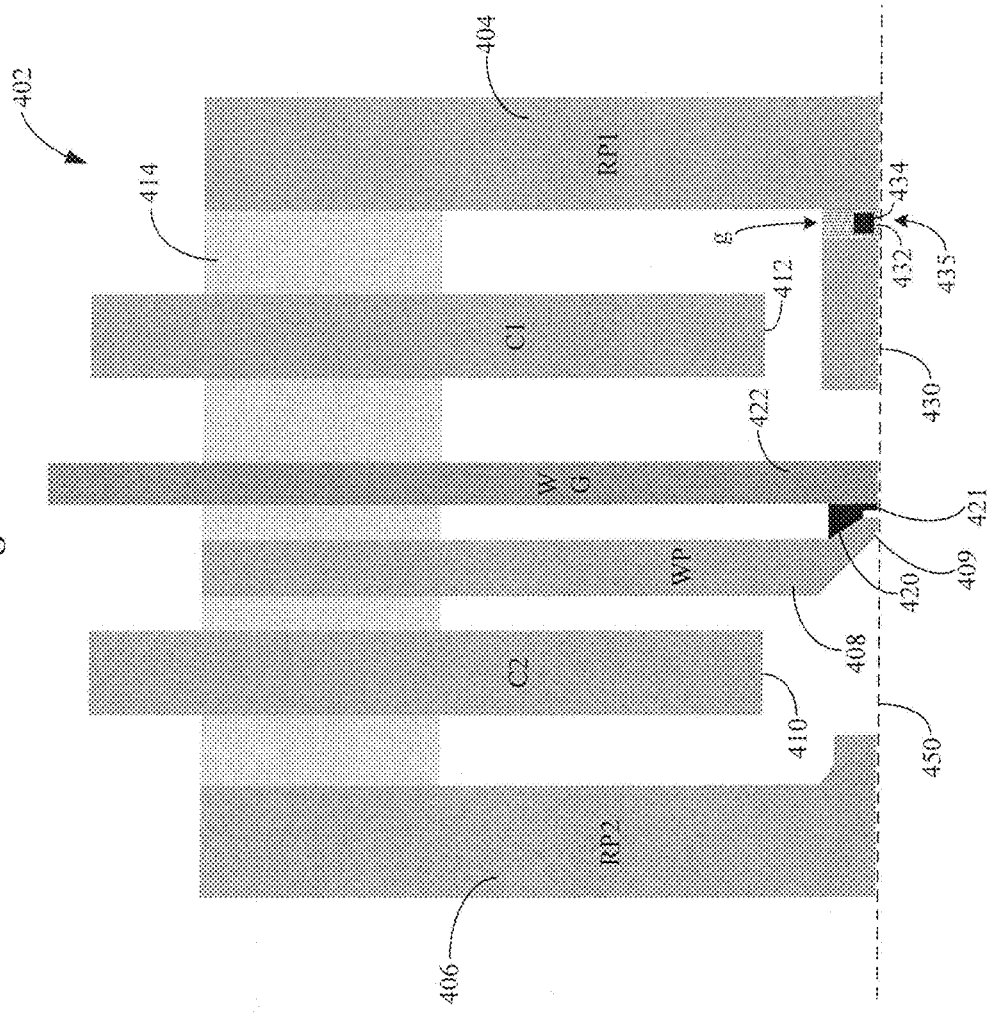
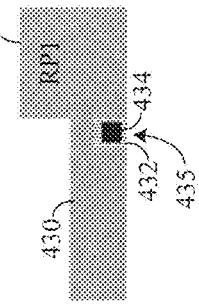

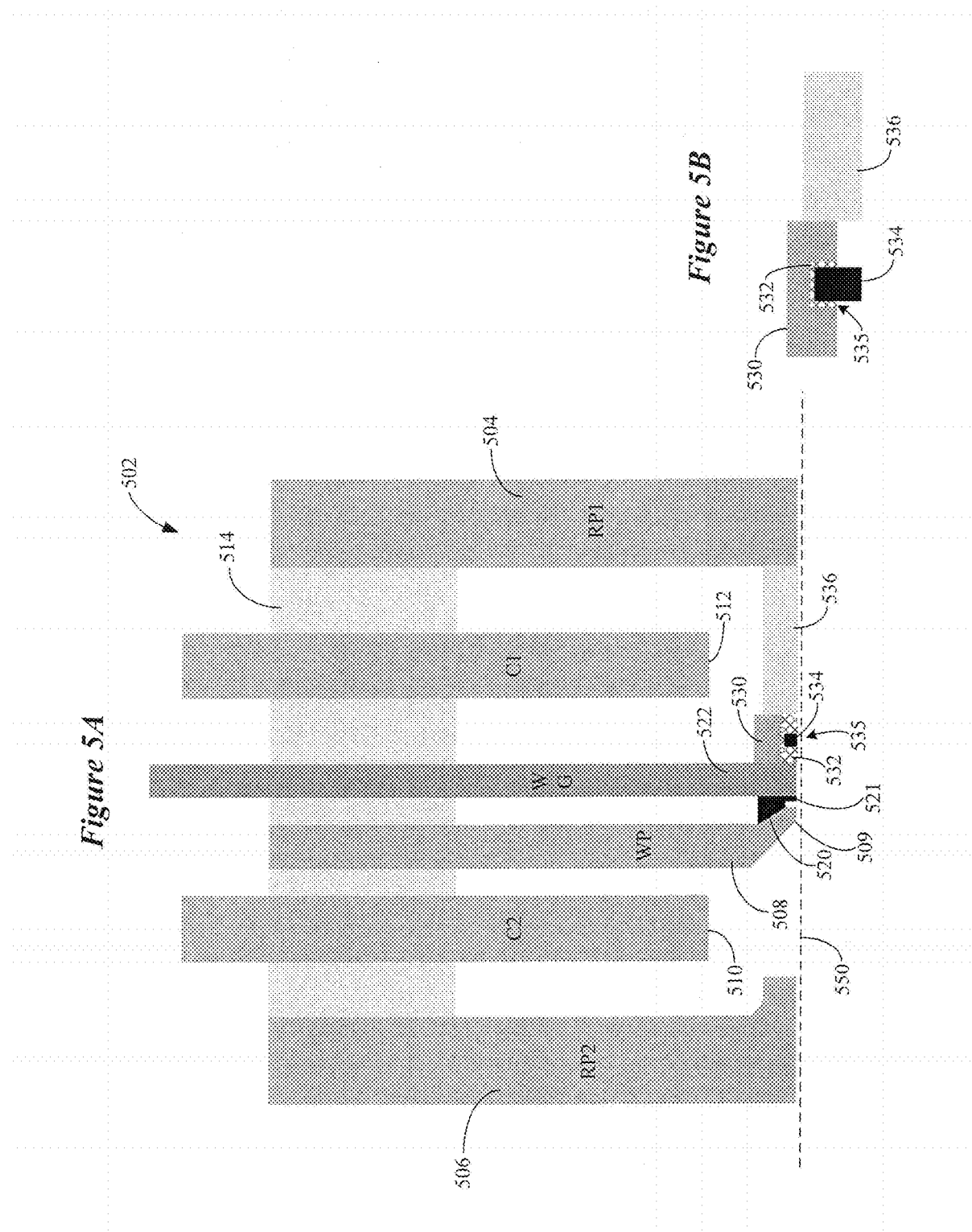

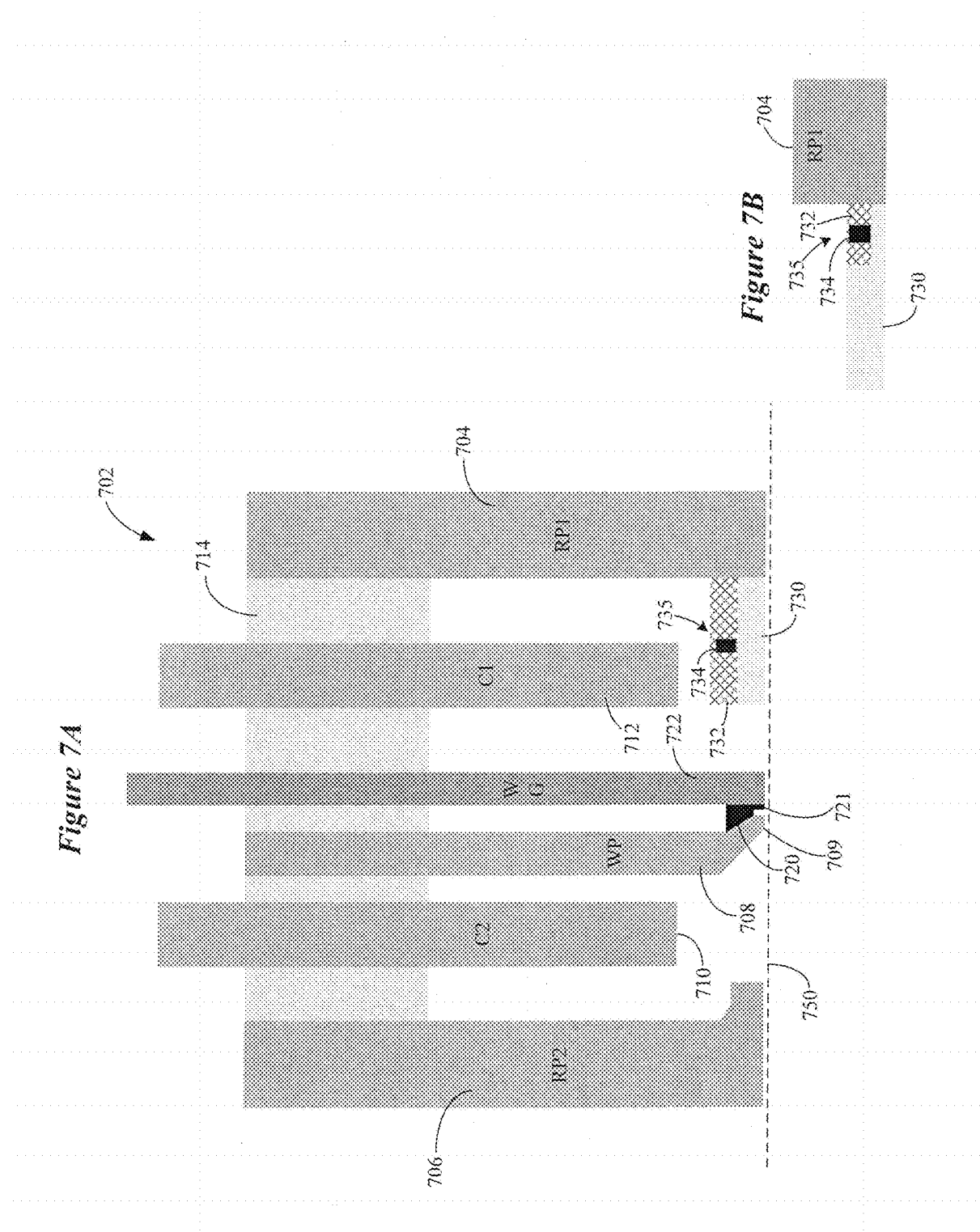

CONTACT DETECTION AND LASER POWER MONITORING SENSOR FOR HEAT-ASSISTED MAGNETIC RECORDING HEAD

RELATED PATENT DOCUMENTS

This application is a continuation of U.S. patent application Ser. No. 15/626,468, filed on Jun. 19, 2017, which claims the benefit of Provisional Patent Application Ser. No. 62/385,016, filed on Sep. 8, 2016, to which priority is claimed and which are incorporated herein by reference in their entireties.

SUMMARY

Various embodiments are directed to an apparatus comprising a slider configured for heat-assisted magnetic recording. The slider comprises a magnetic writer, a near-field transducer, and an optical waveguide coupling the near-field transducer to a light source. The writer is situated proximate the near-field transducer at an air bearing surface of the slider and comprises a first return pole, a second return pole, and a write pole situated between and spaced apart from the first return pole and the second return pole. A structural element is situated at or near the air bearing surface between the write pole and one of the first and second return poles. The structural element comprises a cavity. A thermal sensor is disposed in the cavity. The thermal sensor is configured for sensing contact between the slider and a magnetic recording medium, thermal asperities of the medium, and output optical power of the light source.

Other embodiments are directed to an apparatus comprising a slider configured for heat-assisted magnetic recording. The slider comprises a magnetic writer, a near-field transducer, and an optical waveguide coupling the near-field transducer to a light source. The writer is situated proximate the near-field transducer at an air bearing surface of the slider and comprises a first return pole, a second return pole, and a write pole situated between and spaced apart from the first and second return poles. A structural element is situated at or near the air bearing surface between the write pole and the first return pole. The structural element comprises a cavity. A thermal sensor is disposed in the cavity. The thermal sensor is configured for sensing contact between the slider and a magnetic recording medium, thermal asperities of the medium, and output optical power of the light source.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 4A shows a writer region of a HAMR slider which incorporates a multi-function sensor in accordance with various embodiments;

FIG. 4B shows various details of the slider region proximate the multi-function sensor shown in FIG. 4A;

FIG. 5A shows a writer region of a HAMR slider which incorporates a multi-function sensor in accordance with various embodiments;

FIG. 5B shows various details of a region proximate the multi-function sensor shown in FIG. 5A;

FIG. 7A shows a writer region of a HAMR slider which incorporates a multi-function sensor in accordance with various embodiments;

FIG. 7B shows various details of a region proximate the multi-function sensor shown in FIG. 7A;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to heat-assisted magnetic recording, which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature having dimensions less than 100 nm (e.g., ~50 nm).

Figure 1:
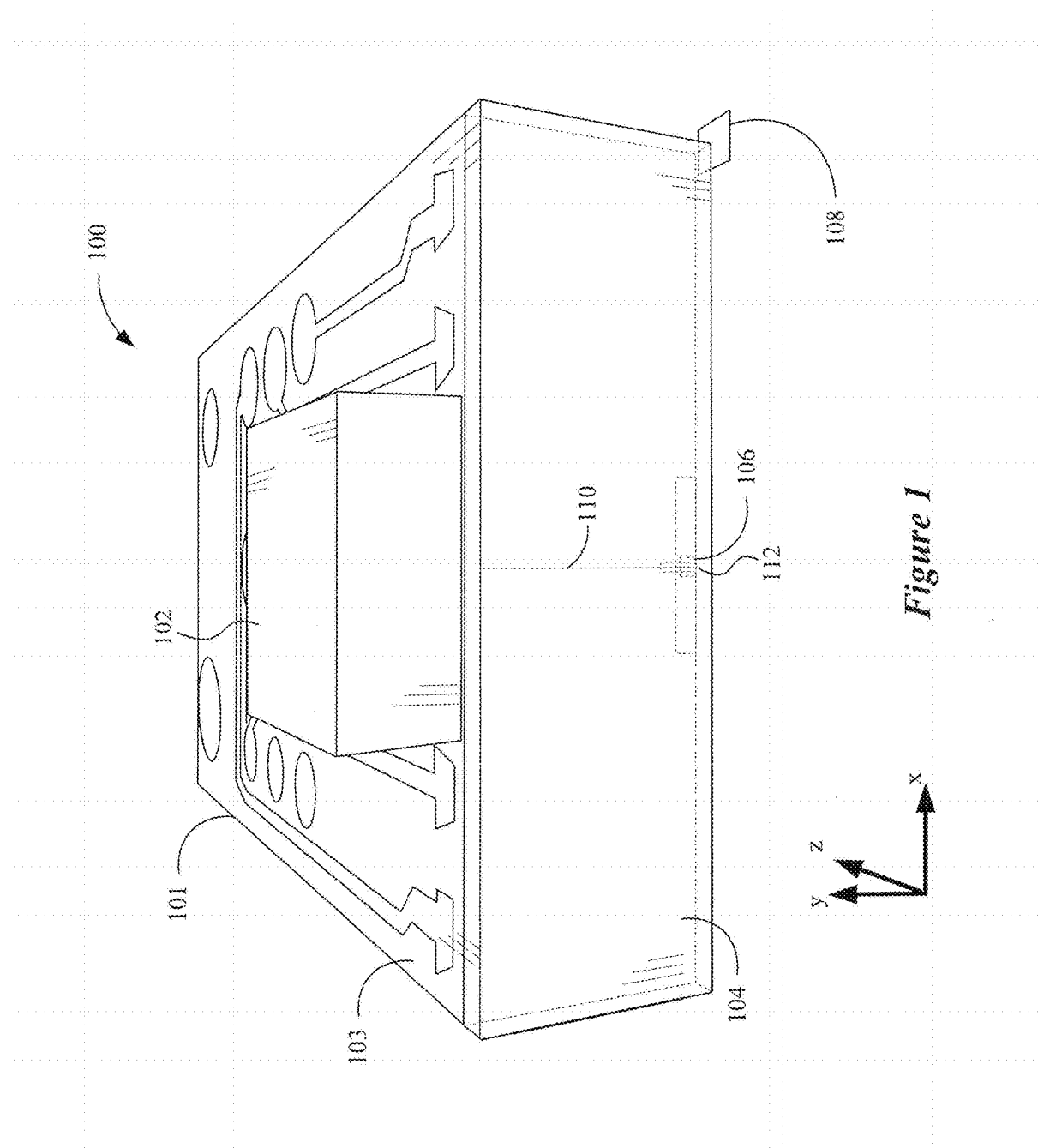
FIG. 1 is a perspective view of a hard drive slider configured for heat-assisted magnetic recording (HAMR) in accordance with embodiments described herein.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components are formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider body by way of optic fiber and/or waveguide. An input surface of the slider body 101 may include a grating or other coupling feature to receive light from the laser via the optic fiber and/or waveguide.

Figure 2:
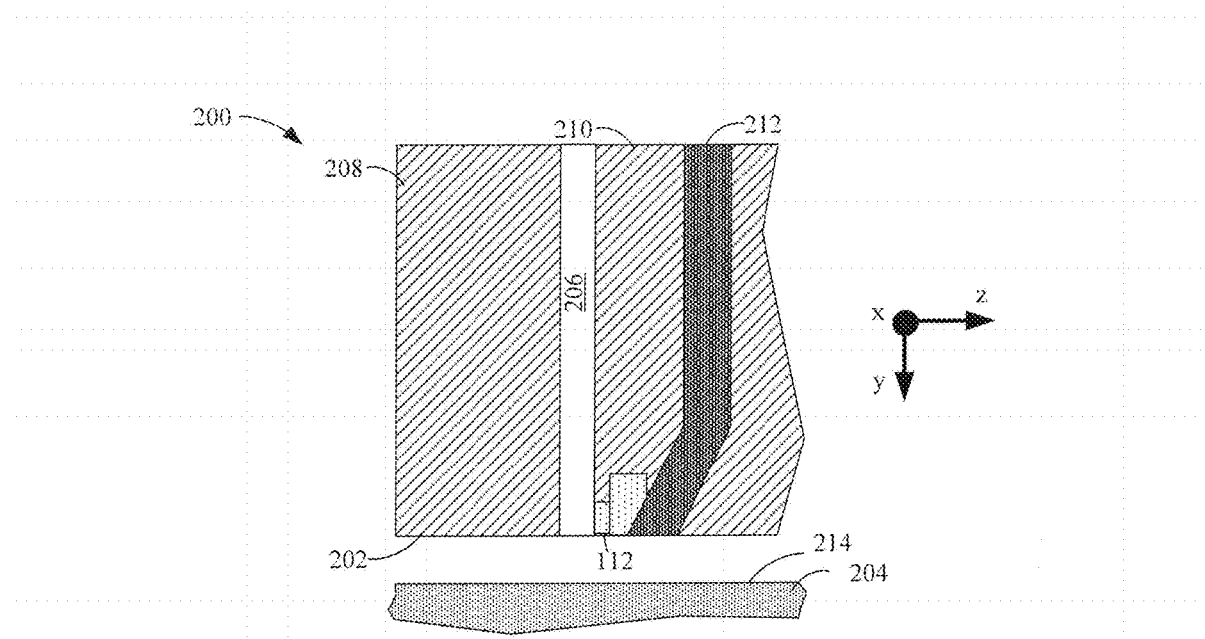
FIG. 2 is a cross-sectional view showing details of a HAMR slider according to various implementations.

With reference now to FIG. 2, a cross-sectional view shows details of a HAMR apparatus 200 according to an example embodiment. Near-field transducer 112 is located proximate a media-facing surface 202 (e.g., ABS), which is held near a magnetic recording media 204 during device operation. In the orientation of FIG. 2, the media-facing surface 202 is arranged parallel to the x-z plane. A waveguide core 206 may be disposed proximate the NFT 112, which is located at or near the media writing surface 214.

The waveguide core 206 surrounded by cladding layers 208, 210. The waveguide core 206 and cladding layers 208, 210 may be made from dielectric materials. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. The NFT 112 delivers surface plasmon enhanced, near-field electromagnetic energy along the y-axis where it exits at the media writing surface 214. This may result in a highly localized hot spot (not shown) on the media surface 214 when the media 204 placed in close proximity to surface 202 of the apparatus 200. Further illustrated in FIG. 2 is a write pole 212 of the read/write head that is located alongside the NFT 112. The write pole 212 generates a magnetic field (e.g., perpendicular field) used in changing the magnetic orientation of the hotspot during writing.

Figure 3:
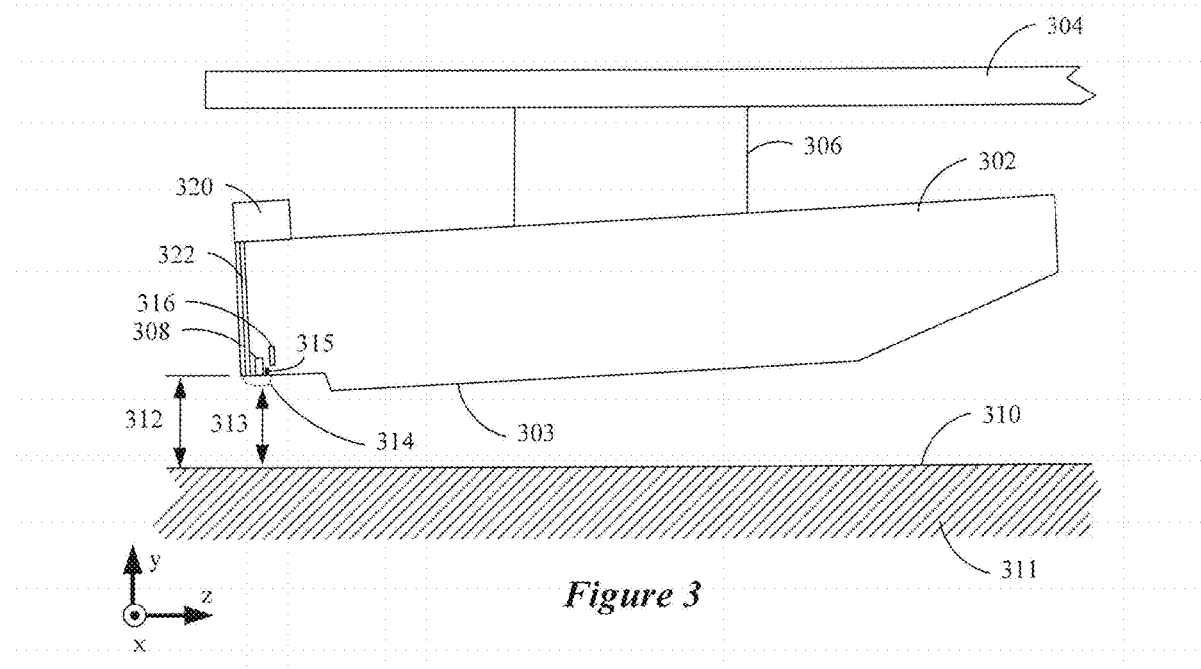
FIG. 3 illustrates a HAMR slider in accordance with some aspects described herein.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read/write head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via one or more heaters 316. A sensor 315 is shown situated at or near the close point 314 of the writer of the read/write transducers 308. The sensor 315 is preferably a combined contact detection and laser power monitoring sensor in accordance with various embodiments.

Embodiments of the disclosure are directed to a HAMR slider which incorporates a multi-function sensor configured for contact detection and laser power monitoring. The multi-function sensor is situated at or near the air bearing surface of the slider and can be used to monitor the output optical power of a laser diode of the slider and detect contact between the slider and a magnetic recording medium. In addition, the multi-function sensor can be used to monitor slider fly height and/or detect thermal asperities of the medium. For example, during a detection mode, the multi-function sensor can be used to monitor slider fly height and detect contact between the slider and a magnetic recording medium and/or thermal asperities of the medium. In a laser power monitoring mode, the multi-function sensor can be used to monitor the output optical power of the laser diode of the slider. The multi-function sensor requires connection to only two electrical bond pads of the slider.

The region of a HAMR slider around the NFT and write pole can be considered a critical zone where the thermal gradient and magnetic field are generated for recording. Proper operation of components within the critical zone requires very high fabrication accuracy. For example, designs for structures that are proximate the NFT tend to be very sensitive to process conditions. This sensitivity applies not only to structure dimensions, location, and materials, but also to fabrication intangibles such as sputter re-deposition and milling-induced oxide damage.

The NFT and write pole of a HAMR slider are subject to high temperature during operation, which can negatively impact the service life of these components. As such, it is desirable to provide monitoring of these components (e.g., sensing temperature, sensing output optical power of the laser diode). However, the optical and magnetic performance of the slider can be adversely impacted by the presence of structures (e.g., a sensor) introduced into the critical zone. Moreover, the requirement of very high fabrication accuracy makes it challenging to fabricate such structures within the critical zone.

A region of the slider proximate the critical zone at or near the air bearing surface can be considered a parasitic zone. Optical and/or magnetic elements can be installed within the parasitic zone while negligibly impacting the optical and magnetic performance of the slider. Structural elements can be formed within the parasitic zone with a fabrication accuracy less stringent than those required for the critical zone. Various embodiments of the disclosure are directed to a HAMR slider which incorporates a structural element and thermal sensor within the parasitic zone. Some embodiments are directed to a thermal sensor installed in a cavity within or formed by a structural element in the parasitic zone. It has been found that a thermal sensor installed in a cavity within or formed by a structural element in the parasitic zone provides robust sensing performance, has negligible interaction with optical or magnetic performance, does not increase the temperature of the critical zone, and has minimal interaction with critical optical or magnetic fabrication.

FIG. 4A shows a writer region of a HAMR slider which incorporates a multi-function sensor in accordance with various embodiments. The writer region shown in FIG. 4A includes a magnetic writer 402, an NFT 420, and an optical waveguide 422 which couples the NFT 420 to a light source (e.g., laser diode). The NFT 420, a terminal end of the optical waveguide 422, and components of the magnetic writer 402 are situated at an air bearing surface 450 (also referred to as a media-facing surface) of the slider.

The embodiment of the magnetic writer 402 shown in FIG. 4A includes a first return pole (RP1) 404, a second return pole (RP2) 406, and a write pole 408 situated between and spaced apart from the first and second return poles 404 and 406. A first coil (C1) 412 is situated between the write pole 408 and the first return pole 404. A second coil (C2) 410 is situated between the write pole 408 and the second return pole 406. Magnetic vias 414 can be included to magnetically couple various magnetic components of the magnetic writer 402. The NFT 420 is shown in contact with an angled portion of the write pole 408 proximate a write pole tip 409. As shown, the NFT 420 has an angled heat sink region in contact with the angled portion of the write pole 408 (e.g., an NTS or near-field stadium design). A peg 421 of the NFT 420 is situated adjacent the write pole tip 409. It is understood that the components and arrangement of components of the writer region can differ from that shown in FIG. 4A in accordance with various designs.

The magnetic writer 402 further includes a structural element 430 shown situated at the ABS 450. The structural element 430 is positioned between the write pole 408 and the first return pole 404. In the embodiment shown in FIG. 4A, the structural element 430 is a magnetic structure, such as a leading magnetic shield of the magnetic writer 402. According to other embodiments, the structural element 430 can constitute a contact pad of the slider. A gap, g, is shown between the leading magnetic shield 430 and a terminal end portion of the first return pole 404 proximate the ABS 450. The gap, g, can have a size of between about 100 and 300 nm, for example. The gap, g, can be filled with a dielectric material 432, such as alumina. The leading magnetic shield 430 and gap fill material 432 define a structural element having a cavity 435 at the ABS 450. A thermal sensor 434 is disposed in the cavity 435.

FIG. 4B shows an alternative configuration of the cavity 435 within which the thermal sensor 434 is positioned. In the embodiment shown in FIG. 4B, the leading magnetic shield 430 extends to and connects with the terminal end portion of the first return pole 404. The cavity 435 is formed within the leading magnetic shield 430 at the ABS 450, such that a portion of the leading magnetic shield 430 extends over the cavity 435 and connects with the terminal end portion of the first return pole 404. The thermal sensor 434 is positioned within the cavity 435. A dielectric material 432 can fill the remainder of the cavity 435 or cover the thermal sensor 434, which electrically insulates the thermal sensor 434 from the leading magnetic shield 430 and first return pole 404.

The thermal sensor 434 is a multi-function sensor configured for sensing contact and changes in spacing between the slider and a magnetic recording medium and for sensing output optical power of a light source coupled to the NFT 420 via the waveguide 422. In some embodiments, the thermal sensor 434 is configured for sensing slider-medium contact, thermal asperities, and output optical power of the light source. According to various embodiments, the thermal sensor 434 comprises a temperature coefficient of resistance (TCR) sensor (e.g., a DETCR or dual-ended temperature coefficient of resistance sensor). For example, the thermal sensor 434 can be formed as a bar-shaped resistor. In other embodiments, the thermal sensor 434 comprises a thermocouple. In further embodiments, the thermal sensor 434 comprises a photoresistive sensor. Notably, the multi-function thermal sensor 434 requires connection to a maximum of two electrical bond pads of the slider.

With the thermal sensor 434 positioned within the magnetic writer 402 as shown in FIGS. 4A and 4B, the thermal sensor 434 is warmed by the leading magnetic shield 430 due to light absorption (e.g., stray light from the waveguide 408 and/or NFT 420) and thermal conduction. Changes in output optical power of the laser diode result in changes in light absorption by the leading magnetic shield 430, resulting in corresponding changes in the output of the thermal sensor 434. The output of the thermal sensor 434 can be used to monitor the output optical power of the laser diode, such as during a laser power monitoring mode. During a contact detection mode, the thermal sensor 434 is responsive to temperature changes due to contact between the slider and a magnetic recording medium and/or thermal asperities of the medium. The thermal sensor 434 is also responsive to temperature changes resulting from changes in slider fly height.

FIG. 5A shows a writer region of a HAMR slider which incorporates a multi-function sensor in accordance with other embodiments. The writer region shown in FIG. 5A has a configuration similar to that shown in FIG. 4A. In particular, the writer region shown in FIG. 5A includes a magnetic writer 502, an NFT 520, and an optical waveguide 522 which couples the NFT 520 to a light source. The magnetic writer 502 includes a first return pole (RP1) 504, a second return pole (RP2) 506, and a write pole 508 situated between and spaced apart from the first and second return poles 505 and 506. A first coil (C1) 512 is situated between the write pole 508 and the first return pole 505. A second coil (C2) 510 is situated between the write pole 508 and the second return pole 506. Magnetic vias 514 can be included to magnetically couple various magnetic components of the magnetic writer 502. The NFT 520 is shown in contact with an angled portion of the write pole 508 proximate a write pole tip 509. A peg 521 of the NFT 520 is situated adjacent the write pole tip 509.

The magnetic writer 502 further includes a structural element 530 positioned adjacent the waveguide 522 and near the ABS 550. In the embodiment shown in FIG. 5A, the structural element 530 comprises a metallic optical element. For example, the metallic optical element 530 may be configured as a bottom cladding disc (BCD) positioned adjacent the core of the waveguide 522 in the bottom cladding. The metallic optical element 530 comprises or is covered with a plasmonic metal or alloy, which serves to enhance the plasmonic excitation of the NFT 520. The metallic optical element 530 comprises a reflective surface configured to reflect stray light in a direction of the NFT 520. The reflective surface of the metallic optical element 530 may also be configured to reduce back-reflection of light from the magnetic recording medium to the light source (e.g., to assist in laser mode hop reduction). The magnetic writer 502 also includes a leading magnetic shield 536 situated between the metallic optical element 530 and the first return pole 504.

The metallic optical element 530 shown in FIG. 5A is spaced away from the ABS 550 such that a gap 535 is defined between the metallic optical element 530 and the ABS 550. The gap 535 can be filled with a dielectric material, such as alumina. The metallic optical element 530 and gap fill material 532 define a structural element having a cavity 535 at the ABS 550. A thermal sensor 534 is disposed in the cavity 535. The dielectric material 532 serves to electrically insulate the thermal sensor 534 from the metallic optical element 530 and the leading magnetic shield 536. With the thermal sensor 534 installed in the cavity 535 as shown in FIG. 5A, the thermal sensor 534 is heated by the metallic optical element 530 but does not negatively affect the optical function of the metallic optical element 530 or the NFT 520.

FIG. 5B shows an alternative configuration of the cavity 535 within which the thermal sensor 534 is positioned. In the embodiment shown in FIG. 5B, the metallic optical element 530 includes a notched region dimensioned to receive at least a portion of the thermal sensor 534. Space in the cavity 535 between the metallic optical element 530 and the thermal sensor 534 can be filled with the dielectric material 532 or the thermal sensor 534 can be partially or completely covered by the dielectric material 532.

The thermal sensor 534 is a multi-function sensor of a type described hereinabove. For example, the thermal sensor 534 can be configured for sensing slider-medium contact, thermal asperities, and output optical power of the light source, requiring connection to a maximum of two electrical bond pads. The thermal sensor 534 can comprise a TCR sensor (e.g., a bar-shaped resistor), a thermocouple or a photoresistive sensor.

Figure 5C:
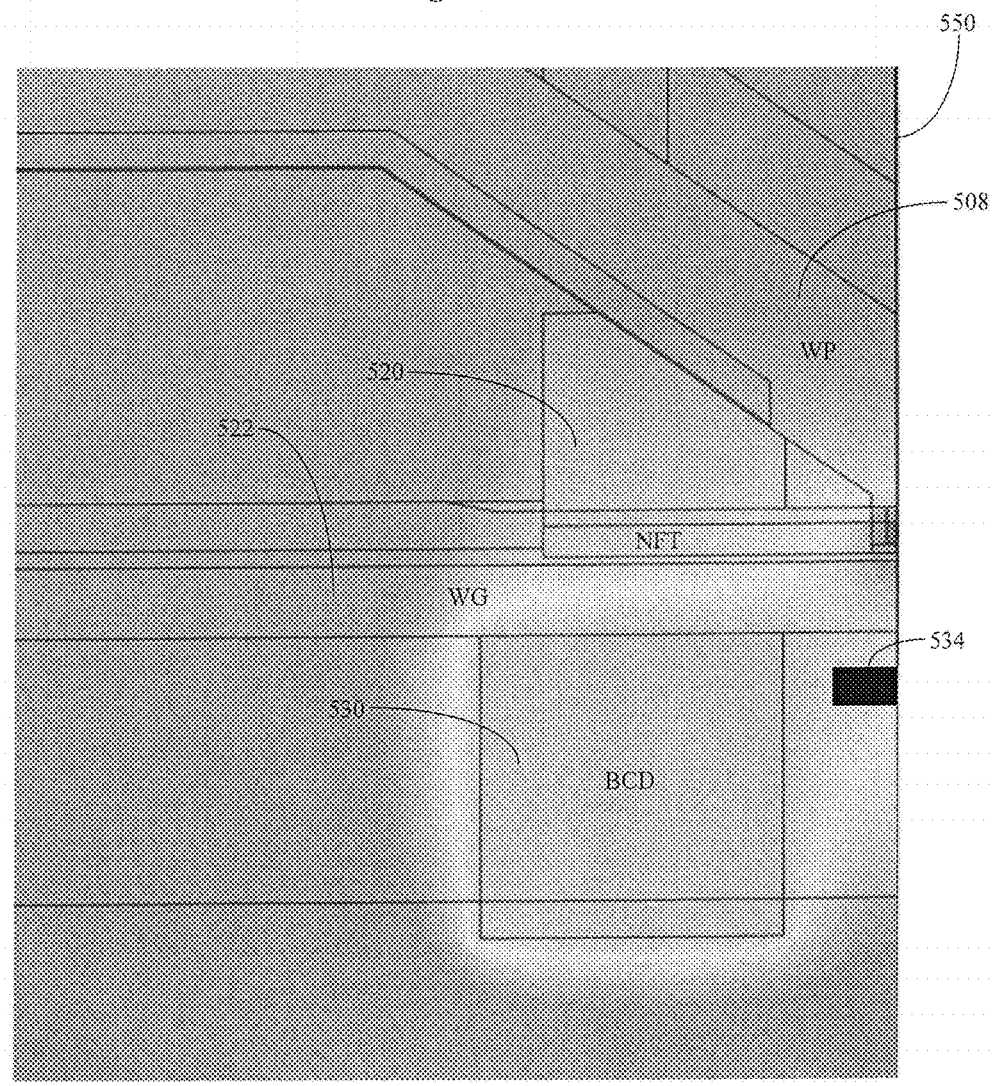
FIG. 5C is a perspective view of the writer region shown in FIG. 5A.

FIG. 5C shows a different view of the embodiment illustrated in FIG. 5A. In FIG. 5C, the metallic optical element 530 is a bottom cladding disc or BCD, which is shown spaced away from the ABS 550 and in contact with a first surface of the waveguide 522. The NFT 520 is positioned adjacent to a second surface of the waveguide 522 opposing the first surface and in contact with the write pole 508. The thermal sensor 534 is situated at the ABS 550, residing within the space between the ABS 550 and the BCD 530. At this location, the thermal sensor 534 is heated by the BCD 530 but does not adversely affect the optical function of the BCD 530 or the NFT 520.

With the thermal sensor 534 positioned within the magnetic writer 502 as shown in FIGS. 5A and 5B, the thermal sensor 534 is warmed by the metallic optical element 530 due to light absorption (e.g., stray light from the waveguide 508 and/or NFT 520) and thermal conduction. Changes in output optical power of the laser diode result in changes in light absorption by the metallic optical element 530, resulting in corresponding changes in the output of the thermal sensor 534. As is discussed above, the output of the thermal sensor 534 can be used to monitor the output optical power of the laser diode (in a laser power monitoring mode), monitor slider fly height, and detect contact between the slider and a magnetic recording medium and/or thermal asperities of the medium (in a contact detection mode).

Figure 6A:
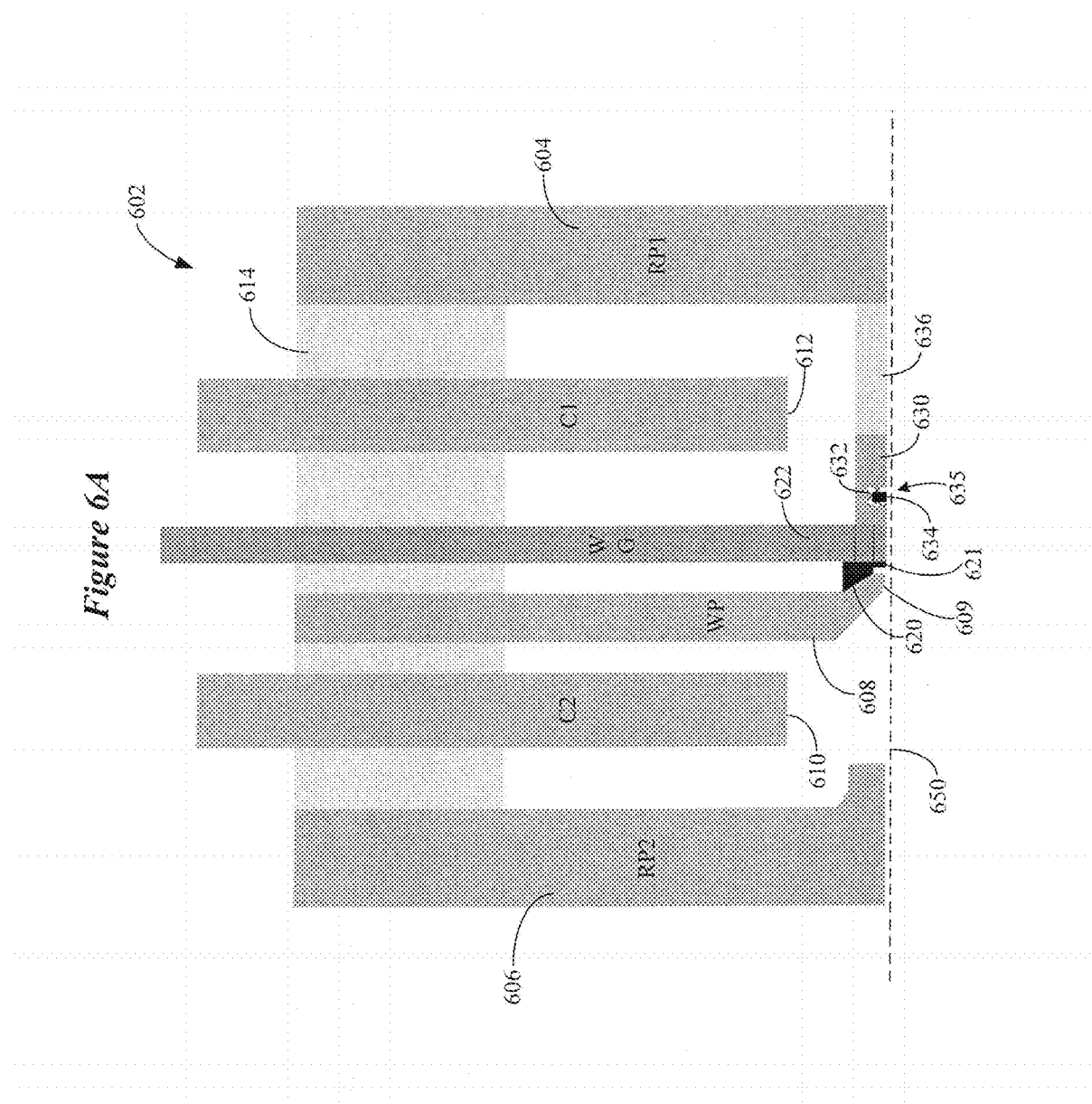
FIG. 6A shows a writer region of a HAMR slider which incorporates a multi-function sensor in accordance with various embodiments.
Figure 6B:
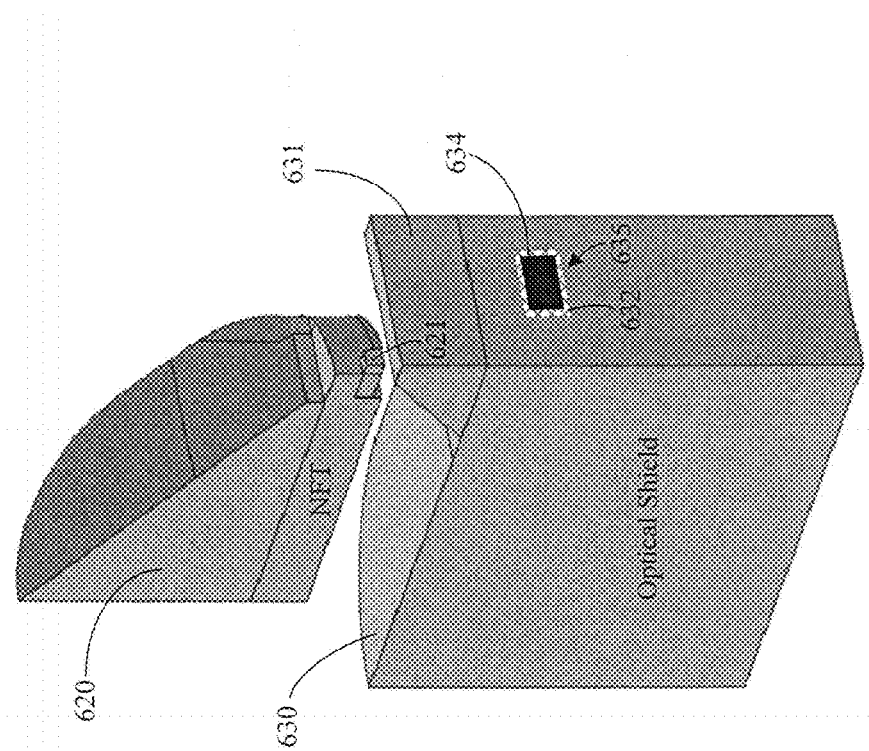
FIG. 6B is a cross-sectional view of a portion of the writer region shown in FIG. 6A.

FIG. 6A shows a writer region of a HAMR slider which incorporates a multi-function sensor in accordance with other embodiments. FIG. 6B is a cross-sectional view of a portion of the writer region shown in FIG. 6A. The writer region shown in FIG. 6A has a configuration similar to that shown in FIGS. 4A and 5A. In particular, the writer region shown in FIG. 6A includes a magnetic writer 602, an NFT 620, and an optical waveguide 622 which couples the NFT 620 to a light source. The magnetic writer 602 includes a first return pole (RP1) 604, a second return pole (RP2) 606, and a write pole 608 situated between and spaced apart from the first and second return poles 605 and 606. A first coil (C1) 612 is situated between the write pole 608 and the first return pole 605. A second coil (C2) 610 is situated between the write pole 608 and the second return pole 606. Magnetic vias 614 can be included to magnetically couple various magnetic components of the magnetic writer 602. The NFT 620 is shown in contact with an angled portion of the write pole 608 proximate a write pole tip 609. A peg 621 of the NFT 620 is situated adjacent the write pole tip 609.

The magnetic writer 602 further includes a structural element 630 positioned at the ABS 650 adjacent the waveguide 622. In the embodiment shown in FIG. 6A, the structural element 630 comprises a metallic optical element in the form of an optical shield. The optical shield 630 serves as a reflector to reflect stray light in a direction of the NFT 620. The optical shield 630 may also be configured to reduce back-reflection of light from the magnetic recording medium to the light source (e.g., to assist in laser mode hop reduction). The optical shield 620 serves to generally improve the optical writing efficiency of the HAMR head (e.g., increasing NFT efficiency, improving the thermal gradient). In some embodiments, the optical shield 630 can extend through the waveguide 622 (e.g., through the waveguide core) and connect with the NFT 620, as is indicated by the broken lines at the terminal end of the waveguide 622. A direct connection between the optical shield 630 and the NFT 620 increases thermal conduction between the NFT 620 and the thermal sensor 632.

Figure 6C:
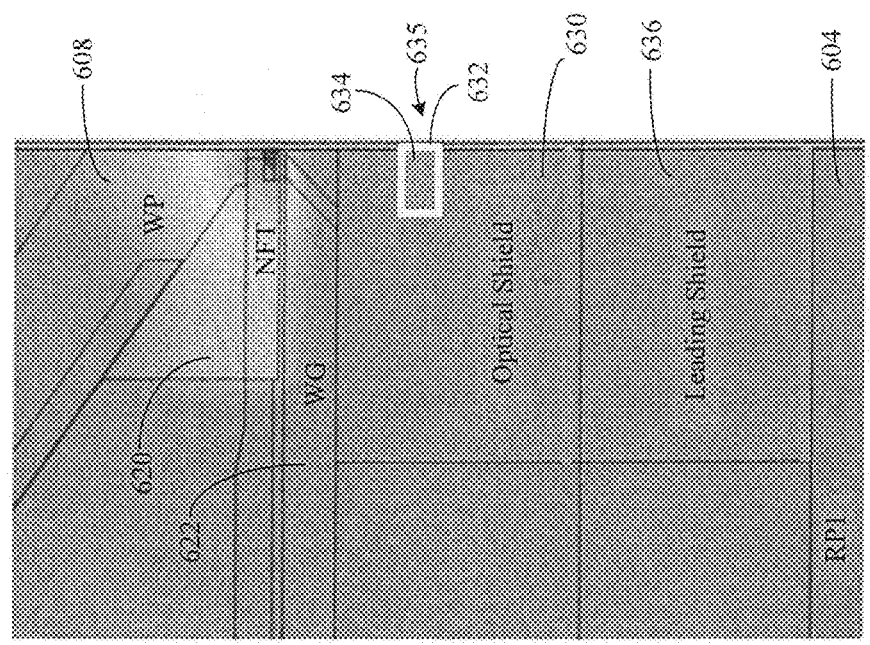
FIG. 6C is a perspective view of the optical shield and NFT shown in FIGS. 6A and 6B.

A perspective view of the optical shield 630 relative to the NFT 620 is shown in FIG. 6C (noting that the waveguide has been removed in this view). FIG. 6C provides a good view of the media-facing surface of the optical shield 630, which includes the cavity 635 into which the thermal sensor 634 is installed and a flange region 631 proximate the peg 621 of the NFT 620. The magnetic writer 602 also includes a leading magnetic shield 636 situated between the optical shield 630 and the first return pole 604.

The optical shield 630 shown in FIGS. 6A, 6B, and 6C is formed to include a cavity 635. The cavity 635 is open to the ABS 650. A thermal sensor 634 is situated within the cavity 635. The space between the walls of the cavity 635 and the thermal sensor 634 can be filled with the dielectric material 632, such as alumina, or the thermal sensor 634 can be covered with the dielectric material 632, which electrically insulates the thermal sensor 634 from the optical shield 630. It is noted that in some embodiments, the dielectric material 632 may not be needed given the small cross track width of the optical shield 630. With the thermal sensor 634 installed in the cavity 635 as shown in FIGS. 6A, 6B, and 6C, the thermal sensor 634 is heated by the optical shield 630 but does not negatively affect the optical function of the optical shield 630 or the NFT 620.

The thermal sensor 634 is a multi-function sensor of a type described hereinabove. For example, the thermal sensor 634 can be configured for sensing slider-medium contact, thermal asperities, and output optical power of the light source, requiring connection to a maximum of two electrical bond pads. The thermal sensor 634 can comprise a TCR sensor (e.g., a bar-shaped resistor), a thermocouple or a photoresistive sensor. In some embodiments, the thermal sensor 634 configured as a TCR sensor can have a cross-track width of about 1-5 µm and a down-track thickness of about 50 nm. It is noted that, to increase the response of the thermal sensor 634, heatsinking of the optical shield 630 to the first return pole 604 can be reduced.

With the thermal sensor 634 positioned within the magnetic writer 602 as shown in FIG. 6A, the thermal sensor 634 is warmed by the optical shield 630 due to light absorption (e.g., stray light from the waveguide 608 and/or NFT 620) and thermal conduction. Changes in output optical power of the laser diode result in changes in light absorption by the optical shield 630, resulting in corresponding changes in the output of the thermal sensor 634. As is discussed above, the output of the thermal sensor 634 can be used to monitor the output optical power of the laser diode (in a laser power monitoring mode), monitor slider fly height, and detect contact between the slider and a magnetic recording medium and/or thermal asperities of the medium (in a contact detection mode).

Figure 7C:
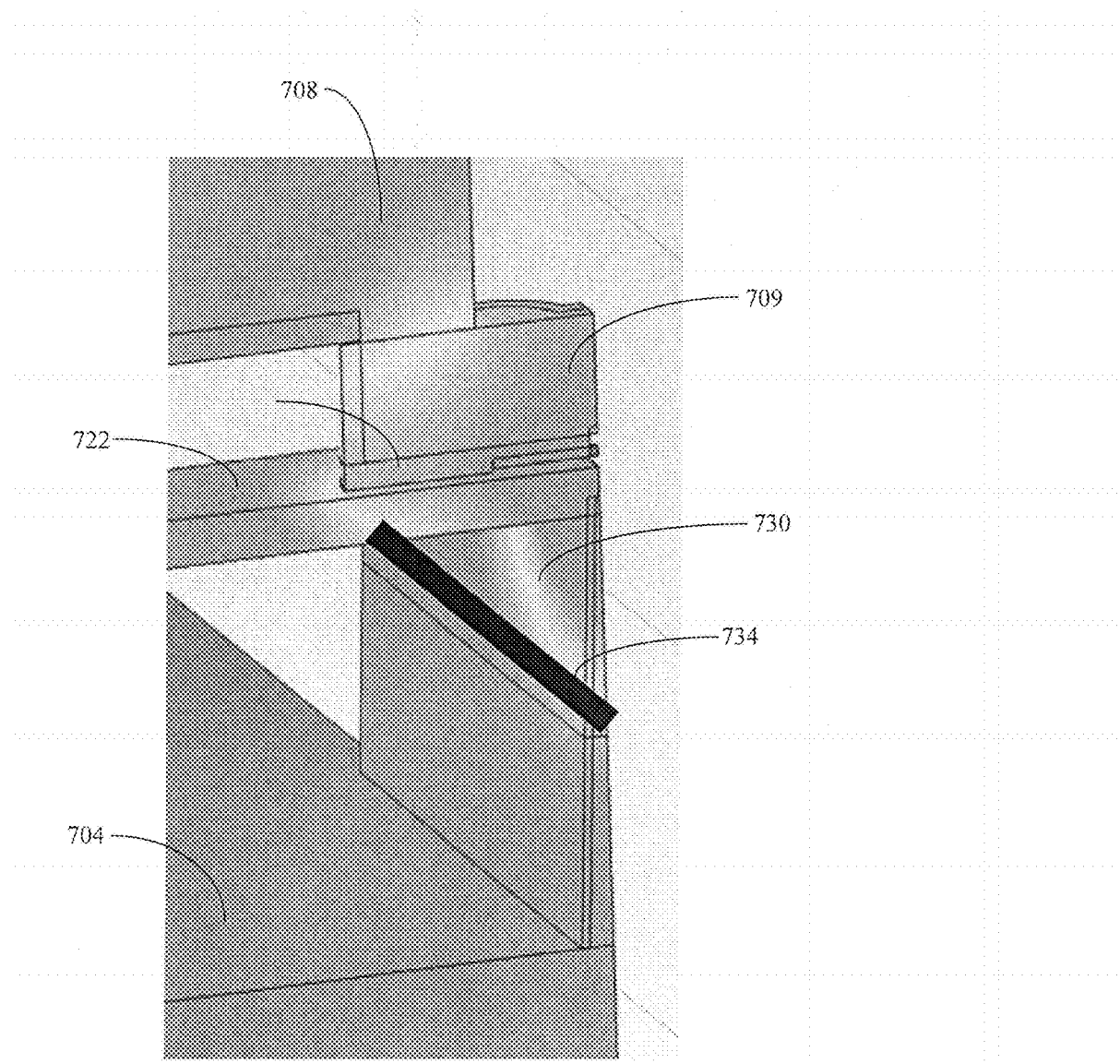
FIG. 7C is a perspective view of a portion of the writer region shown in FIG. 7A.

FIG. 7A shows a writer region of a HAMR slider which incorporates a multi-function sensor in accordance with further embodiments. The writer region shown in FIG. 7A has a configuration similar to that shown in FIGS. 4A, 5A, and 6A. FIG. 7C is a perspective view of a portion of a writer region of a HAMR slider that is similar to that illustrated in FIG. 7A, but includes a different write pole configuration. The writer region shown in FIG. 7A includes a magnetic writer 702, an NFT 720, and an optical waveguide 722 which couples the NFT 720 to a light source. The magnetic writer 702 includes a first return pole (RP1) 704, a second return pole (RP2) 706, and a write pole 708 situated between and spaced apart from the first and second return poles 705 and 706. A first coil (C1) 712 is situated between the write pole 708 and the first return pole 705. A second coil (C2) 710 is situated between the write pole 708 and the second return pole 706. Magnetic vias 714 can be included to magnetically couple various magnetic components of the magnetic writer 702. The NFT 720 is shown in contact with an angled portion of the write pole 708 proximate a write pole tip 709. A peg 721 of the NFT 720 is situated adjacent the write pole tip 709.

The magnetic writer 702 further includes a structural element 730 shown situated at the ABS 750. The structural element 730 is positioned between the write pole 708 and the first return pole 704. In the embodiments shown in FIGS. 7A and 7C, the structural element 730 is a magnetic structure, such as a leading magnetic shield of the magnetic writer 702. The leading magnetic shield 730 is shown in contact with a layer of dielectric material, such as alumina, which together define a structural element having a cavity 735 into which a thermal sensor 734 is installed.

FIG. 7B shows an alternative configuration of the cavity 735 within which the thermal sensor 734 is positioned. In the embodiment shown in FIG. 7B, the leading magnetic shield 730 extends to and connects with the terminal end portion of the first return pole 704. The cavity 735 is formed within the leading magnetic shield 730 at the ABS 750, such that a portion of the leading magnetic shield 730 extends under the cavity 735 (along the ABS 730) and connects with the terminal end portion of the first return pole 704. The thermal sensor 734 is positioned within the cavity 735. A dielectric material 732 can fill the remainder of the cavity 735 or the thermal sensor 734 can be covered with the dielectric material 732, which electrically insulates the thermal sensor 734 from the leading magnetic shield 730 and the first return pole 704.

Figure 7D:
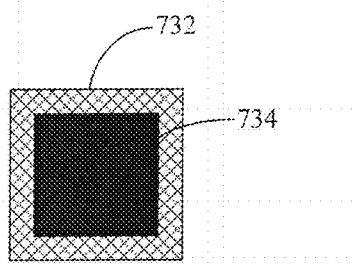
FIG. 7D shows details of a thermal sensor shown in FIG. 7C.

The thermal sensor 734 is a multi-function sensor of a type described hereinabove. For example, the thermal sensor 734 can be configured for sensing slider-medium contact, thermal asperities, and output optical power of the light source, requiring connection to a maximum of two electrical bond pads. The thermal sensor 734 can comprise a TCR sensor (e.g., a bar-shaped resistor), a thermocouple or a photoresistive sensor. As is shown in FIG. 7D, the thermal sensor 734, which may be a bar-shaped resistor, can be wrapped in a dielectric material 732 to prevent electrical shorting.

With the thermal sensor 734 positioned within the magnetic writer 702 as shown in FIGS. 7A and 7B, the thermal sensor 734 is warmed by the leading magnetic shield 730 due to light absorption (e.g., stray light from the waveguide 708 and/or NFT 720) and thermal conduction. Changes in output optical power of the laser diode result in changes in light absorption by the leading magnetic shield 730, resulting in corresponding changes in the output of the thermal sensor 734. As is discussed above, the output of the thermal sensor 734 can be used to monitor the output optical power of the laser diode (in a laser power monitoring mode), monitor slider fly height, and detect contact between the slider and a magnetic recording medium and/or thermal asperities of the medium (in a contact detection mode).

Figure 8A:
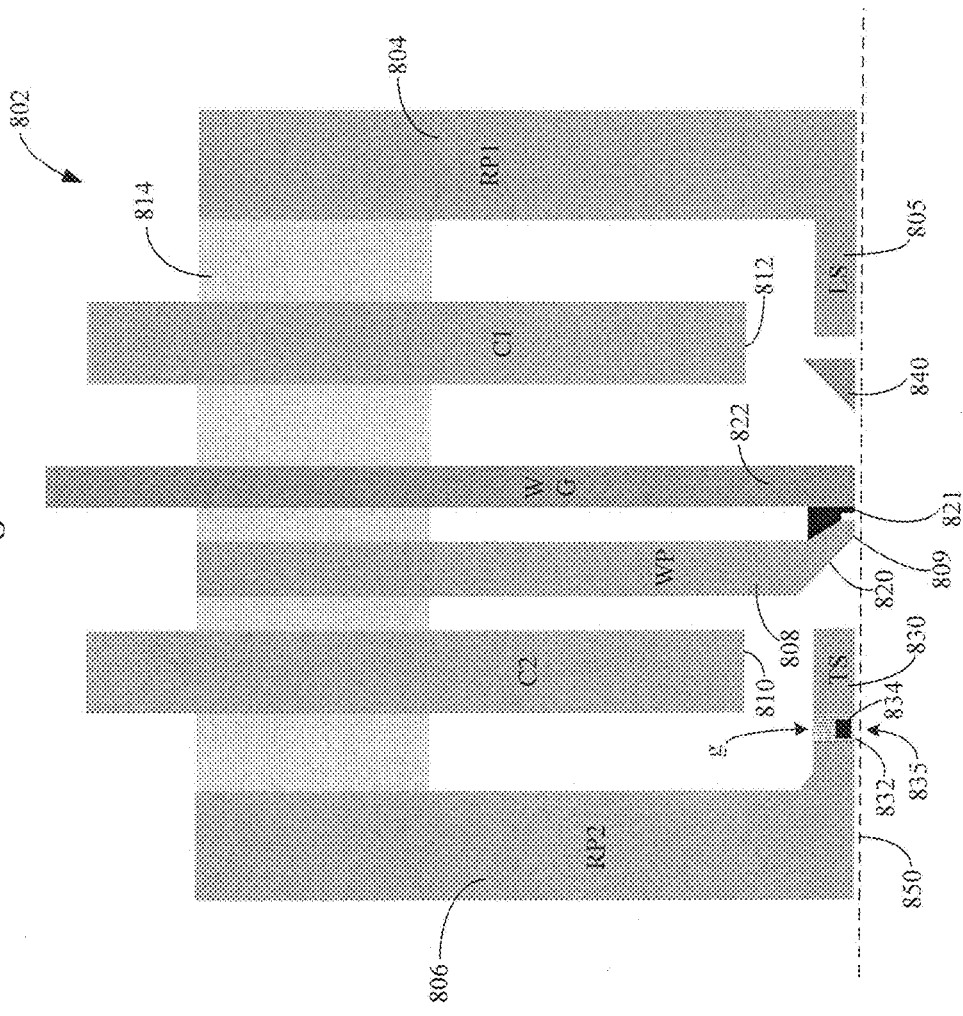
FIG. 8A shows a writer region of a HAMR slider which incorporates a multi-function sensor in accordance with various embodiments.

FIG. 8A shows a writer region of a HAMR slider which incorporates a multi-function sensor in accordance with various embodiments. The writer region shown in FIG. 8A is similar to that shown in previous figures, and includes a magnetic writer 802, an NFT 820, and an optical waveguide 822 which couples the NFT 820 to a light source, such as a laser diode. The NFT 820, a terminal end of the optical waveguide 822, and components of the magnetic writer 802 are situated at an air bearing surface 850 of the slider.

The embodiment of the magnetic writer 802 shown in FIG. 8A includes a first return pole (RP1) 804, a second return pole (RP2) 806, and a write pole 808 situated between and spaced apart from the first and second return poles 804 and 806. A leading magnetic shield 805 extends along the ABS 880 between the write pole 808 and the first return pole 804. As shown, the leading magnetic shield 805 is connected to the first return pole 804. A first coil (C1) 812 is situated between the write pole 808 and the first return pole 804. A second coil (C2) 810 is situated between the write pole 808 and the second return pole 806. Magnetic vias 814 can be included to magnetically couple various magnetic components of the magnetic writer 802. The NFT 820 is shown in contact with an angled portion of the write pole 808 proximate a write pole tip 809. A peg 821 of the NFT 820 is situated adjacent the write pole tip 809.

The magnetic writer 802 further includes a structural element 830 shown situated at the ABS 850. The structural element 830 is positioned between the write pole 808 and the second return pole 806. In the embodiment shown in FIG. 8A, the structural element 830 is a magnetic structure, such as a trailing magnetic shield of the magnetic writer 802. According to other embodiments, the structural element 830 can constitute a contact pad of the slider. A gap, g, is shown between the trailing magnetic shield 830 and a terminal end portion of the second return pole 806 proximate the ABS 850. The gap, g, can have a size of between about 100 and 300 nm. The gap, g, can be filled with a dielectric material 832, such as alumina. The trailing magnetic shield 830 and gap fill material 832 define a structural element having a cavity 835 at the ABS 850. A thermal sensor 834 is disposed in the cavity 835.

Figure 8B:
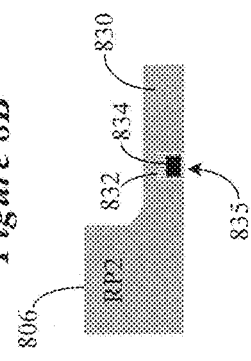
FIG. 8B shows various details of a region proximate the multi-function sensor shown in FIG. 8A.

FIG. 8B shows an alternative configuration of the cavity 835 within which the thermal sensor 834 is positioned. In the embodiment shown in FIG. 8B, the trailing magnetic shield 830 extends to and connects with the terminal end portion of the second return pole 806. The cavity 835 is formed within the trailing magnetic shield 830 at the ABS 850, such that a portion of the trailing magnetic shield 830 extends over the cavity 835 and connects with the terminal end portion of the second return pole 806. The thermal sensor 834 is positioned within the cavity 835. A dielectric material 832 can fill the remainder of the cavity 835 or cover the thermal sensor 834, which electrically insulates the thermal sensor 834 from the trailing magnetic shield 830.

The thermal sensor 834 is a multi-function sensor of a type described hereinabove. For example, the thermal sensor 834 can be configured for sensing slider-medium contact, thermal asperities, and output optical power of the light source, requiring connection to a maximum of two electrical bond pads. The thermal sensor 834 can comprise a TCR sensor (e.g., a bar-shaped resistor), a thermocouple or a photoresistive sensor.

With the thermal sensor 834 positioned at the trailing magnetic shield 830 of the magnetic writer 802, light propagated along the waveguide 808 and to the NFT 820 is largely blocked by the write pole 808. In the embodiment shown in FIG. 8A, a reflector 840 is provided to direct stray light to the trailing magnetic shield 830. The reflector 840 is shown situated between the waveguide 822 and the leading magnetic shield 805. At least a portion of the reflector 840 is positioned out of plane with respect to the write pole 808, allowing light to be communicated around the write pole 808 and impinge on the trailing magnetic shield 830. Changes in output optical power of the laser diode result in changes in light absorption by the trailing magnetic shield 830, resulting in corresponding changes in the output of the thermal sensor 834. As is discussed above, the output of the thermal sensor 834 can be used to monitor the output optical power of the laser diode (in a laser power monitoring mode), monitor slider fly height, and detect contact between the slider and a magnetic recording medium and/or thermal asperities of the medium (in a contact detection mode).

Figure 9A:
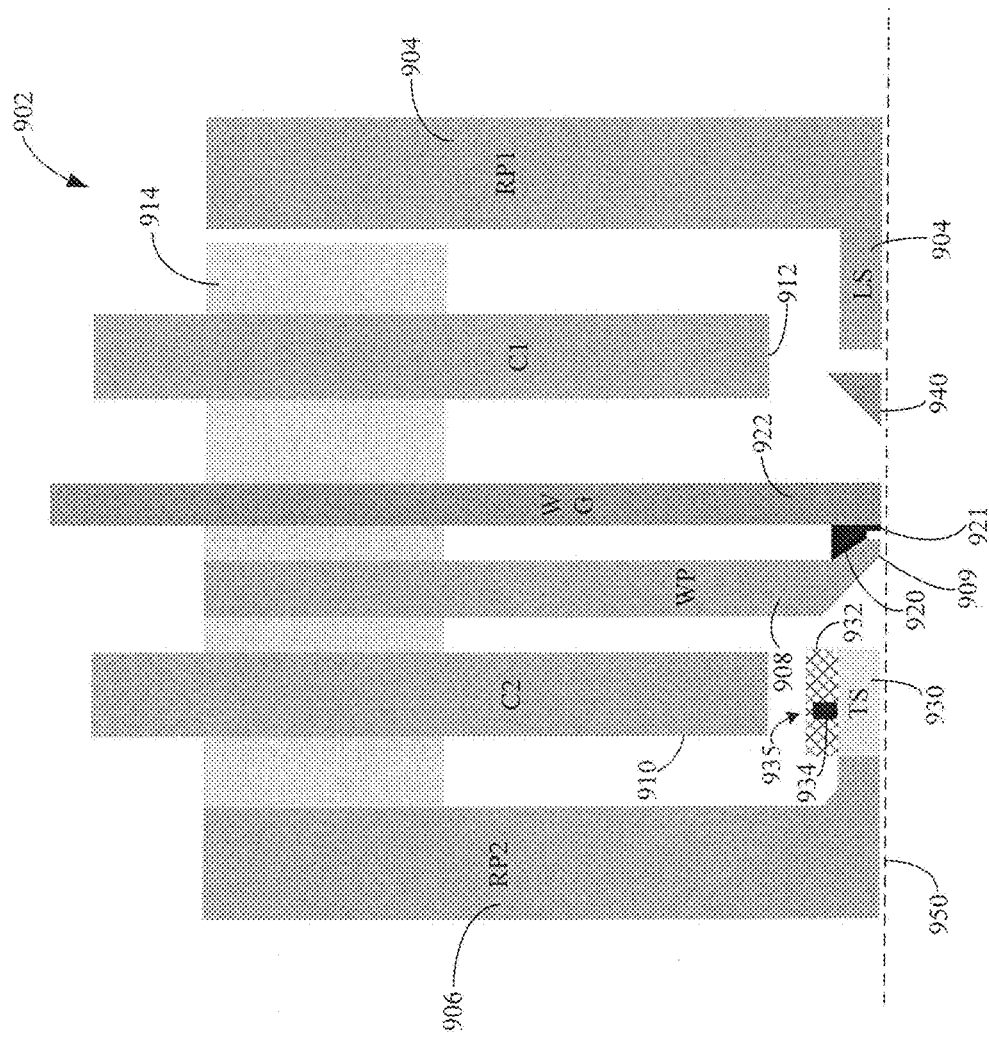
FIG. 9A shows a writer region of a HAMR slider which incorporates a multi-function sensor in accordance with various embodiments.

FIG. 9A shows a writer region of a HAMR slider which incorporates a multi-function sensor in accordance with various embodiments. The writer region shown in FIG. 9A has a configuration similar to that shown in previous figures. In particular, the writer region shown in FIG. 9A includes a magnetic writer 902, an NFT 920, and an optical waveguide 922 which couples the NFT 920 to a light source. The magnetic writer 902 includes a first return pole (RP1) 904, a second return pole (RP2) 906, and a write pole 908 situated between and spaced apart from the first and second return poles 905 and 906. A first coil (C1) 912 is situated between the write pole 908 and the first return pole 905. A second coil (C2) 910 is situated between the write pole 908 and the second return pole 906. Magnetic vias 914 can be included to magnetically couple various magnetic components of the magnetic writer 902. The NFT 920 is shown in contact with an angled portion of the write pole 908 proximate a write pole tip 909. A peg 921 of the NFT 920 is situated adjacent the write pole tip 909.

The magnetic writer 902 further includes a structural element 930 shown situated at the ABS 950. The structural element 930 is positioned between the write pole 908 and the second return pole 906. In the embodiment shown in FIG. 9A, the structural element 930 is a magnetic structure, such as a trailing magnetic shield of the magnetic writer 902. The trailing magnetic shield 930 is shown in contact with a layer of dielectric material, such as alumina, which together define a structural element having a cavity 935 into which a thermal sensor 934 is installed.

Figure 9B:
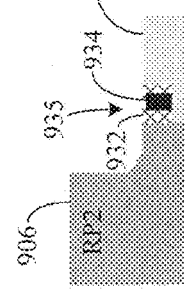
FIG. 9B shows various details of a region proximate the multi-function sensor shown in FIG. 9A.

FIG. 9B shows an alternative configuration of the cavity 935 within which the thermal sensor 934 is positioned. In the embodiment shown in FIG. 9B, the trailing magnetic shield 930 extends to and connects with the terminal end portion of the second return pole 906. The cavity 935 is formed within the trailing magnetic shield 930 at the ABS 950, such that a portion of the trailing magnetic shield 930 extends under the cavity 935 (along the ABS 930) and connects with the terminal end portion of the second return pole 906. The thermal sensor 934 is positioned within the cavity 935. A dielectric material 932 can fill the remainder of the cavity 935 or the thermal sensor 934 can be covered with the dielectric material 932, which electrically insulates the thermal sensor 934 from the trailing magnetic shield 930 and the second return pole 906.

The thermal sensor 934 is a multi-function sensor of a type described hereinabove. For example, the thermal sensor 934 can be configured for sensing slider-medium contact, thermal asperities, and output optical power of the light source, requiring connection to a maximum of two electrical bond pads. The thermal sensor 934 can comprise a TCR sensor (e.g., a bar-shaped resistor), a thermocouple or a photoresistive sensor. The thermal sensor 934 may be a bar-shaped resistor, which can be wrapped in a dielectric material 932 to prevent electrical shorting.

With the thermal sensor 934 positioned at the trailing magnetic shield 930 of the magnetic writer 902, light propagated along the waveguide 908 and to the NFT 920 is largely blocked by the write pole 908. In the embodiment shown in FIG. 9A, a reflector 940 is provided to direct stray light to the trailing magnetic shield 930. The reflector 940 is shown situated between the waveguide 922 and the leading magnetic shield 905. At least a portion of the reflector 940 is positioned out of plane with respect to the write pole 908 to allow light to be communicated around the write pole 908 and impinge on the trailing magnetic shield 930. Changes in output optical power of the laser diode result in changes in light absorption by the trailing magnetic shield 930, resulting in corresponding changes in the output of the thermal sensor 934. As is discussed above, the output of the thermal sensor 934 can be used to monitor the output optical power of the laser diode (in a laser power monitoring mode), monitor slider fly height, and detect contact between the slider and a magnetic recording medium and/or thermal asperities of the medium (in a contact detection mode).

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a slider configured for heat-assisted magnetic recording and comprising a magnetic writer, a near-field transducer, and an optical waveguide coupling the near-field transducer to a light source;
   the writer situated proximate the near-field transducer at an air bearing surface of the slider and comprising:
   a first return pole;
   a second return pole; and
   a write pole situated between and spaced apart from the first return pole and the second return pole;
   a metallic optical element comprising a cavity situated at or near the air bearing surface between the write pole and one of the first and second return poles, the optical element comprising a reflective surface configured to one or both of reflect stray light in a direction of the near-field transducer and reduce back-reflection of light from a magnetic recording medium to the light source; and
   a thermal sensor disposed in the cavity, the thermal sensor configured to output a signal indicative of optical power of the light source and one or both of sense thermal asperities of the medium and contact between the slider and the medium.

2. The apparatus of claim 1, wherein the reflective surface of the optical element is configured to reflect stray light in the direction of the near-field transducer and reduce back-reflection of light from the medium to the light source.

3. The apparatus of claim 1, wherein the optical element comprises a magnetic shield.

4. The apparatus of claim 3, wherein the magnetic shield comprises a leading magnetic shield of the writer.

5. The apparatus of claim 3, wherein the magnetic shield comprises a trailing magnetic shield of the writer.

6. The apparatus of claim 1, wherein the thermal sensor comprises a TCR (temperature coefficient of resistance) sensor.

7. The apparatus of claim 1, wherein the thermal sensor comprises a thermocouple or a photoresistive sensor.

8. The apparatus of claim 1, wherein the optical element is situated between the write pole and the second return pole.

9. The apparatus of claim 1, wherein:
   the cavity comprises a gap between the optical element and one of the first and second return poles; and
   the thermal sensor is disposed in the gap.

10. An apparatus, comprising:
    a slider configured for heat-assisted magnetic recording and comprising a magnetic writer, a near-field transducer, and an optical waveguide coupling the near-field transducer to a light source;
    the writer situated proximate the near-field transducer at an air bearing surface of the slider and comprising:
    a first return pole;
    a second return pole; and
    a write pole situated between and spaced apart from the first return pole and the second return pole;
    a metallic optical element comprising a cavity situated at or near the air bearing surface between the write pole and the first return pole, the optical element comprising a reflective surface configured to one or both of reflect stray light in a direction of the near-field transducer and reduce back-reflection of light from a magnetic recording medium to the light source; and
    a thermal sensor disposed in the cavity, the thermal sensor configured to output a signal indicative of optical power of the light source and one or both of sense thermal asperities of the medium and contact between the slider and the medium.

11. The apparatus of claim 10, wherein the reflective surface of the optical element is configured to reflect stray light in the direction of the near-field transducer and reduce back-reflection of light from the medium to the light source.

12. The apparatus of claim 10, wherein the optical element comprises a magnetic shield.

13. The apparatus of claim 10, wherein:
    the cavity comprises a gap between the optical element and the first return pole of the writer; and
    the thermal sensor is disposed in the gap.

14. An apparatus, comprising:
a slider configured for heat-assisted magnetic recording and comprising a magnetic writer, a near-field transducer, and an optical waveguide coupling the near-field transducer to a light source, the writer situated proximate the near-field transducer at an air bearing surface of the slider;
a metallic optical element comprising a cavity situated at or near the air bearing surface and proximate the optical waveguide, the optical element comprising a reflective surface configured to one or both of reflect stray light in a direction of the near-field transducer and reduce back-reflection of light from a magnetic recording medium to the light source; and
a thermal sensor disposed in the cavity, the thermal sensor configured to output a signal indicative of optical power of the light source and one or both of sense thermal asperities of the medium and contact between the slider and the medium.

15. The apparatus of claim 14, wherein the reflective surface of the optical element is configured to reflect stray light in the direction of the near-field transducer and reduce back-reflection of light from the medium to the light source.

16. The apparatus of claim 14, wherein the optical element comprises a magnetic shield.

17. The apparatus of claim 16, wherein the magnetic shield comprises a leading magnetic shield of the writer.

18. The apparatus of claim 16, wherein the magnetic shield comprises a trailing magnetic shield of the writer.

19. The apparatus of claim 14, wherein the thermal sensor comprises a TCR (temperature coefficient of resistance) sensor, a thermocouple or a photoresistive sensor.

20. The apparatus of claim 14, wherein:
the cavity comprises a gap between the optical element and one of a first and second return pole of the writer; and
the thermal sensor is disposed in the gap.

* * * * *